(12) United States Patent
Dempsey

(10) Patent No.: US 7,971,830 B2
(45) Date of Patent: Jul. 5, 2011

(54) SYSTEM AND METHOD FOR SPACE ELEVATOR DEPLOYMENT

(76) Inventor: James G. Dempsey, Oshkosh, WI (US)

( * ) Notice: Subject to any disclaimer, the term of this patent is extended or adjusted under 35 U.S.C. 154(b) by 650 days.

(21) Appl. No.: 12/150,752

(22) Filed: May 1, 2008

(65) Prior Publication Data
US 2010/0051750 A1    Mar. 4, 2010

(51) Int. Cl.
*B64G 1/00*    (2006.01)
(52) U.S. Cl. .................. 244/158.2; 244/172.6
(58) Field of Classification Search .............. 244/158.1, 244/158.2, 158.5, 159.4, 159.6, 167, 172.6
See application file for complete search history.

(56) References Cited

U.S. PATENT DOCUMENTS

| | | | | | |
|---|---|---|---|---|---|
| 3,168,263 | A | * | 2/1965 | Kamm | 244/167 |
| 3,423,755 | A | * | 1/1969 | Ward et al. | 343/705 |
| 3,427,623 | A | * | 2/1969 | Yater | 343/705 |
| 3,496,995 | A | * | 2/1970 | Stein et al. | 165/46 |
| 4,727,932 | A | * | 3/1988 | Mahefkey | 165/41 |
| 6,945,499 | B1 | * | 9/2005 | Robinson | 244/158.2 |
| 6,981,674 | B1 | | 1/2006 | Dempsey | |

* cited by examiner

*Primary Examiner* — Tien Dinh
*Assistant Examiner* — Michael Kreiner

(57) ABSTRACT

A system and method for the initial deployment of a space elevator using a tether, doubly spooled from each end, an inertial mass, beacon satellite and positional thrusters, whereby tether is de-spooled from geosynchronous Earth orbit altitude, using gravity and centripetal force gradient, and timed such that when the tethers fully de-spool or near the point of being fully de-spooled, are released and the free ends, one left to fall inwards to Earth anchor point, and the other left to fall outwards to tether end ballast support point, result in an Earth anchored self supporting tension structure.

12 Claims, 6 Drawing Sheets

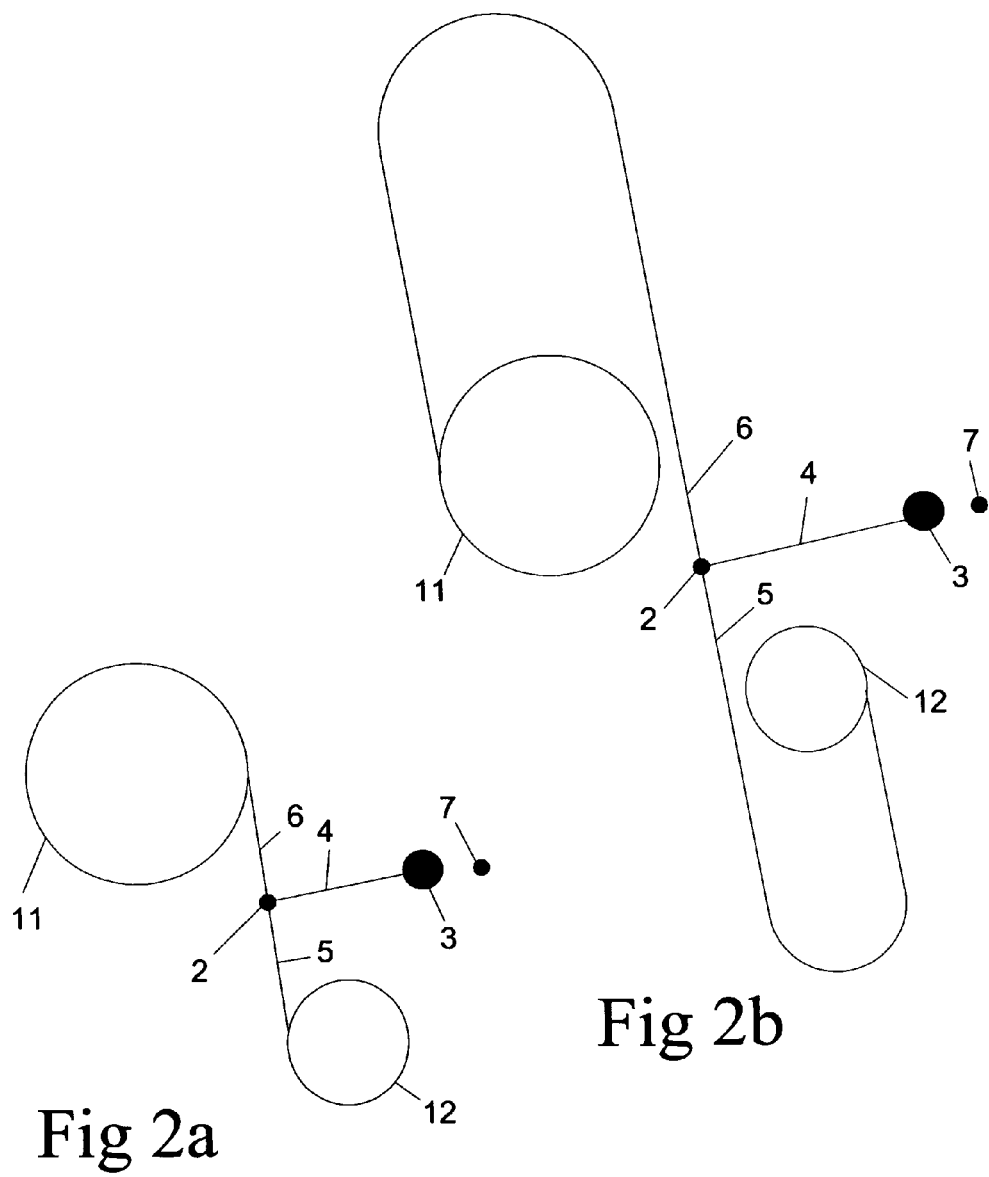

SYSTEM AND METHOD FOR SPACE ELEVATOR DEPLOYMENT

CROSS-REFERENCE TO RELATED APPLICATIONS

U.S. Pat. No. 6,981,674 Jan. 3, 2006 Dempsey

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

None

BACKGROUND OF THE INVENTION

A space elevator is a self supporting tension structure consisting primarily of a tether attached at one end near the Earth equator and the other end extending radially outwards. When the tether has sufficient length, approximately 100,000 kilometers, the aggregate centripetal force along the full length of tether exceeds the aggregate gravitational force permitting the tether to become self supporting. Once the space elevator is installed, climbing devices will clamp on to the tether and will be electrically driven up or down the tether to deliver a payload to a desired altitude.

Although the finished structure is relatively well understood by those familiar with the art, the initial deployment of the space elevator is problematic. This invention describes a system an method for initial deployment of a space elevator.

In examining U.S. Pat. No. 6,981,674 Jan. 3, 2006 Dempsey, in the background of the invention section you will find discussion on the single tether space elevator. Whereas Dempsey's U.S. Pat. No. 6,981,674 covers a more complicated space elevator system consisting of multiple tethers. In consulting FIG. 1 of Dempsey's U.S. Pat. No. 6,981,674, one component, to wit the left side tether, shown as 2, includes a space elevator consisting of a single tether 2, connecting to Earth 7, at anchor point 6, passing through a near geosynchronous Earth orbiting object 30 and extending up to the end of tether ballast above geosynchronous Earth orbit altitude, shown as 8. What was not discussed in the aforementioned Patent is how you initially launch and deploy said tether. The invention described in this specification describes the system and method for deployment of the initial tether for space elevators.

BRIEF SUMMARY OF THE INVENTION

An initial tether is wound onto two spools from the end points inwards to a point on the tether that approximates a length equivalent to the geosynchronous Earth orbit altitude. One spool will contain the Earth side of the tether (approximately $\frac{1}{3}^{rd}$ of the total tether) and the second spool will contain the outbound side of the tether (approximately $\frac{2}{3}^{rds}$ of the total tether). The spools of tether and service equipment (deployment vehicle) are launched into a geosynchronous Earth orbit altitude (tether deployment location) located above the eventual Earth attachment point for the tether. The Earth attachment point is generally near the equator.

The deployment vehicle will be met at the deployment location by an inertial mass. The inertial mass may consist of a collection of one or more abandoned communication satellites ferried to the deployment location or the inertial mass may consist of additional tether material for use in subsequent buildup of the space elevator. The inertial mass also could be additional equipment for use later or a co-launched satellite who's inertial mass will be used briefly before being sent on its final destination. The inertial mass can be made up from a collection of sources of mass previously stated or additional mass sources not specified.

The tether spools will be kept within or attached to the deployment vehicle. The deployment vehicle and the approximate GEO position of the tether (initially the exposed portion of tether between the two spools) are attached to the inertial mass by means of a connective tether or truss system. Attached to the inertial mass will be a propulsion system such as the tug craft used to reposition the abandoned communications satellite or the propulsion system could be that of the deployment vehicle. The propulsion system is used for station keeping of the inertial mass during deployment and for orbital adjustment of the inertial mass after deployment.

A beacon satellite is discharged from the deployment vehicle into an orbital path which will precede the orbital path of the inertial mass object. The purpose of the beacon satellite is to provide an orbital reference point for use in station keeping of the inertial mass object. During deployment the beacon satellite will experience the same tidal effects as does the inertial mass object but without the unbalanced tensions imparted on the inertial mass object by the deploying tethers.

The deployment progresses with each spool deploying a loop. The Earth-end tether loop is deployed downwards and the outbound tether loop is deployed upwards. Once sufficient tether is deployed to experience a gravity/centripetal gradient, the loops will elongate approximating the shape of a tied shoelace.

To facilitate the initiation of the deployment, either the spools will be offset from the deployment vehicle by some distance along a radial line from Earth in the desired directions, or a puller device will extract an initial portion of the tether loops in the desired directions. The initial offset, or portions of loops drawn out, will be of sufficient length to experience a gravity plus centripetal gradient suitable for extraction of the remainder tether from the spools.

Deployment acceleration is relatively low at first and increases during deployment. The deployment rate between the top and bottom tether are synchronized where the completion of deployment is controlled for the benefit of the final deployment solution.

Deployment proceeds until each tether is fully de-spooled, or, in an alternated configuration, one or both tether spools may be released, jointly or independently, from the deployment vehicle prior to full deployment and where one or both of the spools may contain propulsion systems. The tether ends may be coated to attain a higher density and/or higher radar reflectivity and the Earth-end tether end may be constructed for desired aero dynamic characteristics as well as a device to facilitate capture.

During deployment, the Coriolis effect will cause the Earth-bound tether to drift Eastwards and the out-bound tether to drift Westwards. Additionally, the tensions produced by the two tethers will vary in a magnitude and direction such that a tension imbalance will be induced in the tethers across the deployment vehicle. Due to this tension imbalance, one of the principal features of this invention, is the attached ballast mass's inertial property will act against these forces and act as a buffer between the thrust control applied to the ballast mass and the tethers. Without the ballast mass the thrust control becomes difficult, ineffective, and is fuel-wise inefficient.

The ballast mass's inertial property, together with the propulsion system attached to the ballast mass, are used to maintain the position of the ballast mass relative to the beacon satellite, and through the connection device, the positions of the deployment vehicle and attached tethers.

Once both tethers have de-spooled, the ends are let loose and are free to fall towards their final positions. The flight path of the tether ends is reminiscent of the flight path of the bait during fly casting while fishing. In the alternate configuration, the spools are released prior to the de-spooling of the tether, either jointly or independently, and left to fall, while continuing to deploy, towards their intended final positions. Furthermore, in the alternate configuration, either or both spools may contain thruster devices.

The principal concept of the deployment technique is to maintain as much of the tether mass near the geosynchronous Earth orbit position for as long as possible, while deploying a tether mass that is relatively low as compared to the ballast mass. Then late during deployment, upon de-spooling of tethers, or release of the spools from the deployment vehicle, make a fast dash to the final positions. Deployment in this manner causes least orbital deflection of ballast mass and produces a minimum fuel consuming deployment technique. Without the ballast mass, the tether would either fall in to Earth or fall out into an eccentric orbit, unless excessive amount of fuel were consumed in station keeping.

Once the initial tether is attached to the Earth anchor point, and after sufficient tension develops in the upper tether to support the lower tether, the ballast mass is released and the tether is left to stabilize. In an alternate configuration, to facilitate Earth anchorage, excess tether may be wound onto the Earth-end spool of the tether and deployed towards Earth. Then when the final anchorage solution is computed and assured, any excess tether can be pulled back through the tether mounting device located in or attached to the deployment vehicle. If required, multiple movable tether mounting devices may be incorporated such that a serpentine path in the tether can be made between the movable tether mounting devices such that in addition to moving along the tether together, thus pulling tether through the tether mounting device, that the tether mounting devices can move independently along the tether, thus changing the effective length of the tether.

During stabilization, the ballast mass is released from the tether and may be repositioned for subsequent reuse in additional deployments. Once the tether is sufficiently stabilized, the initial tether can then be used in lieu of, or in addition to, a ballast mass, in facilitation of the deployment of additional tether material using the two spool method described herein.

BRIEF DESCRIPTION OF THE SEVERAL VIEWS OF THE DRAWING

FIG. 2a Illustrates the south view of the fully wound spools and the relative positioning of the ballast mass and beacon satellite. For clarity, neither the vehicle in which the spools reside, nor the tug craft attached to the ballast mass, is shown.

FIG. 2b Illustrates the deployment of portions of tether loops drawn out to be of sufficient length to experience a gravity plus centripetal gradient sufficient for extraction of the remainder tether from the spools.

DETAILED DESCRIPTION OF THE INVENTION

Figure 1:
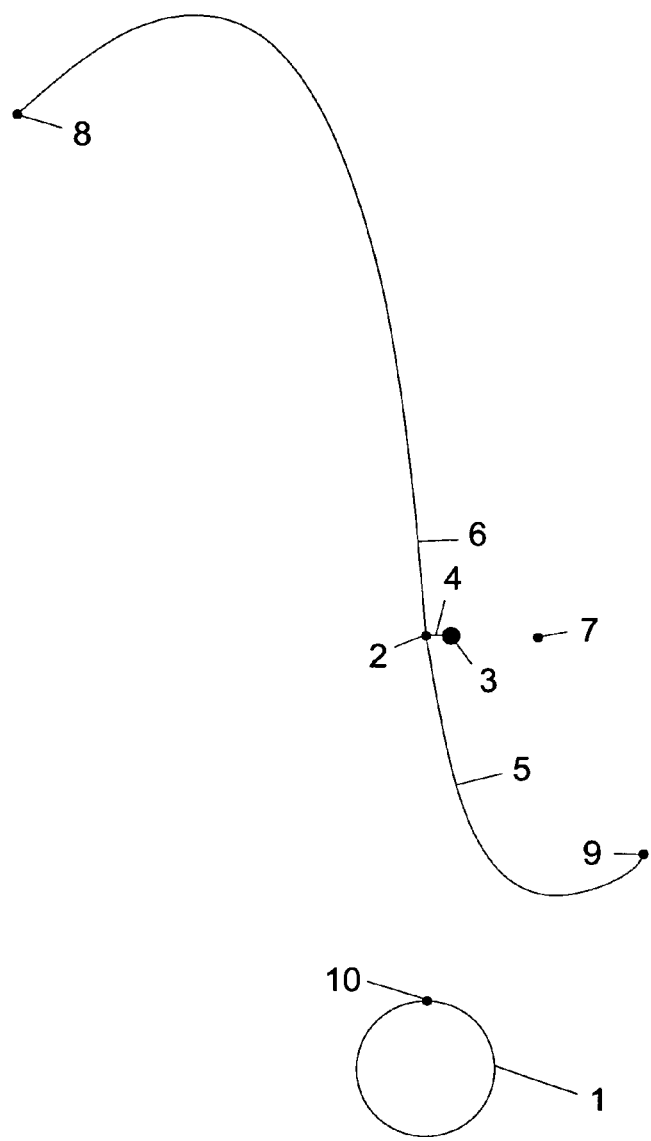
FIG. 1 depicts a preferred embodiment of the invention and illustrates the approximate shape and relative positions, as viewed from the south, of the deploying tethers after/near complete de-spooling of tethers but prior to Earth-end tether attaching to Earth.

Tether material of sufficient properties and dimensions and of length of approximately 100,000 kilometers is wound onto two spools (11 and 12). Approximately two-thirds of the material representing the outbound, upper portion of the tether 6 is wound on an upper spool 11. The remainder of the tether, less a portion of tether between the spools, forms the lower portion of the tether 5, which is wound onto a second, lower spool 12. For secondary tether deployment, the upper and lower tether spools are shown as 11' and 12' respectively in FIG. 4a.

Figures 6A, 6B, 6C:
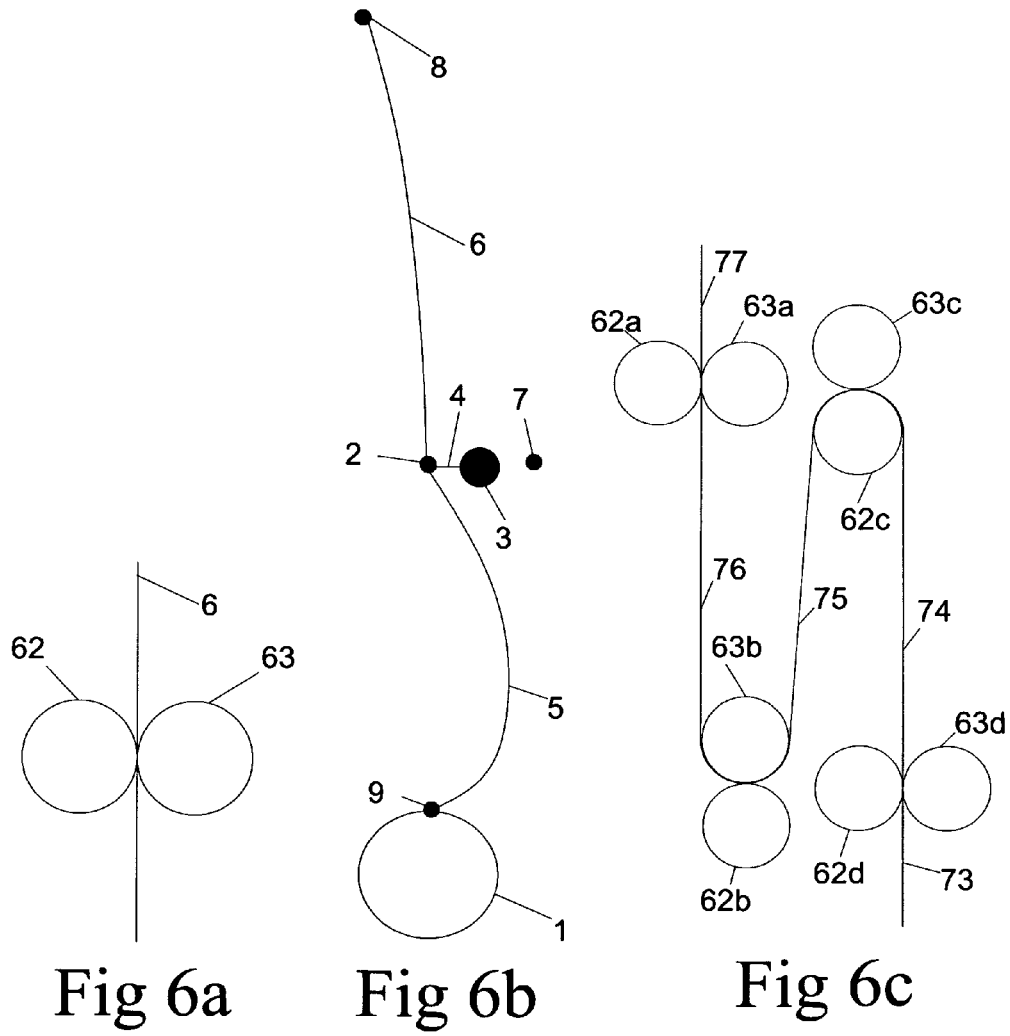
FIG. 6c illustrates an alternate movable clamping device capable of tether slack management.

The aforementioned portion of tether material between the two fully-wound spools represents the portion of the tether that, once fully deployed, will reside in proximity of the geosynchronous Earth orbit altitude. The views of all the figures are from a Southern perspective with Earth represented as 1. Attached to the aforementioned portion of tether material between the two fully wound spools is a tether mounting device 2, shown in greater detail as 62 and 63 in FIG. 6a. FIG. 6c shows an alternate configuration with a serpentine tether path and two independently movable tether mounting devices: an upper movable tether mounting device (62a, 63a, 63b, and 62b), and a lower movable tether mounting device (62c, 62d, 63c and 63d). The depictions of the tether mounting devices are for illustrative purposes only and are not used for the specification of these devices. This invention incorporates the use of such devices, whatever design, for the purposes stated herein.

The, or each, tether mounting device may be fixed or movable (driven along tether) using, for example, a pinching roller configuration as depicted in FIGS. 6a and 6c. The principal purpose of the tether mounting device is to serve as a connection point to the deployment vehicle, not shown, and the ballast mass 3, by way of a connecting device 4 (such as additional tether or a truss). The secondary purpose of the tether mounting device, when mounting device or devices are movable, is to manage the tension differential between the upper portion of the tether and the lower portion of the tether during the stabilization phase of deployment.

Figures 4A, 4B:
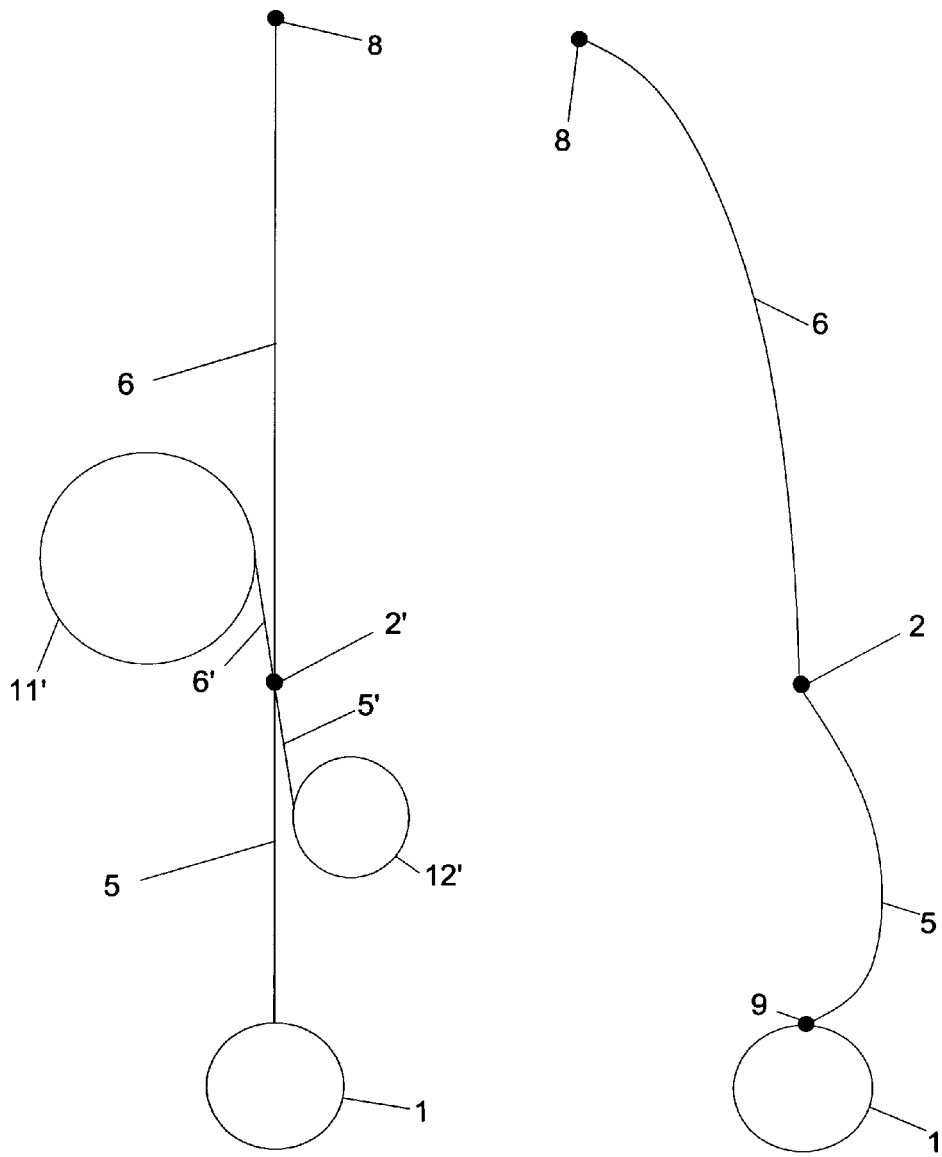
FIG. 4a Illustrates initial arrangement of secondary tether deployment
FIG. 4b Illustrates fully deployed anchored tether prior to stabilization

The deployment vehicle, not shown, is attached to, or contains, the two tether spools 11 and 12, and for secondary tether deployment 11' and 12' in FIG. 4a, and the tether mounting device previously described. The deployment vehicle confines the motion of the spools and tether mounting device.

The ballast mass 3 serves as an inertial buffer for the purpose of assisting the deployment of an otherwise unstable tether configuration. The ballast mass can be obtained from one or more discarded communication satellites already in near-geosynchronous Earth orbit altitude (discarded communication satellites are parked approximately 300 kilometers above geosynchronous Earth orbit altitude). The advantage of this is it avoids the expensed of launching dead-weight mass to geosynchronous Earth orbit altitude. Optionally the ballast mass can be obtained from additional tether brought up with the initial tether, which will be used to increase the load carrying capacity of the space elevator after deployment. Another source for ballast mass is to launch the deployment vehicle (not shown), with initial tether, together with a co-satellite (e.g. new communications satellite) who's inertial mass will be used to assist in the initial deployment of the tether. This would produce a cost sharing of the initial deployment with the owners of the other satellite.

The ballast mass orbital position would be controlled by thrusters, not shown, attached to a tug vehicle, not shown, brought up with the deployment vehicle, or launched separately, and which is attached to the ballast mass such as: dead satellite, new satellite, additional tether, or other equipment. The tether deployment vehicle could alternately serve as this tug vehicle and/or thrusters for the ballast mass.

The tether deployment vehicle discharges a beacon satellite 7. The beacon satellite is positioned in geosynchronous Earth orbit and slightly East of where it is desirable to maintain the ballast mass. The purpose of the beacon satellite is to provide a moving reference point that, from ground, appears to be stationary (a fixed point in Earth frame). The beacon satellite could be replaced by a computational procedure that would calculate the position of said beacon satellite.

The orbital path of the beacon satellite will vary from a circular orbit due to the tidal effect of the moon, Sun, and other planetary bodies. By having the positional maintenance of the ballast mass target the beacon satellite, instead of a fixed point (Earth frame), fuel is conserved by not fighting against these tidal effects.

Deployment of the Earth-bound portion of the tether and out-bound portion of the tether will be facilitated by an acceleration gradient that develops as a composite of the gravitational field and the centripetal acceleration effect acting in opposite directions. This gradient increases with the displacement from the geosynchronous Earth orbiting ballast mass along a radial line from Earth through the ballast mass. This is to say tether deployed below the geosynchronous Earth orbiting ballast mass will tend to fall downwards towards Earth, and tether deployed above the geosynchronous Earth orbiting ballast mass will tend to fall outwards away from Earth.

To facilitate an initial gradient, either the tether spools will be placed at some distance above and below the ballast mass, or an initial portion of the tether loops, shown as 5 and 6 in FIG. 2b, will be extracted from the spools using a device not illustrated. The initial distance from the deployment vehicle, and thus relative altitude compared to the ballast mass 3, can be relatively small, on the order of a few hundred meters. An illustration of the tether loops' initial extraction is depicted by FIG. 2b showing the upper tether spool 11, the upper tether initial loop 6, the lower tether spool 12, the lower tether initial loop 5, the tether mounting device 2, the tether to ballast mass coupler 4, the ballast mass 3 and the beacon satellite 7. Not illustrated in FIG. 2b is the deployment vehicle which is directly attached to the two spools, 11 and 12, and the tether mounting device, 2, and thus indirectly attached to the tethers, 5 and 6, and indirectly attached to the tether to ballast mass coupling device, 4, and thus indirectly connected to the ballast mass, 3.

Once initiated, the deployment will be motivated by the tension built up in each loop due to the respective gravity and centripetal gradients. The deployment rates may be controlled by a breaking device, not shown.

As deployment progresses, unbalanced tensions will build up between the upper tether ends and the lower tether ends. This tension imbalance will induce a net force on the deployment vehicle via the spools, shown as 11 and 12 in FIG. 2, and as 11' and 12' in FIG. 4a, and tether mounting device, shown as 2 in FIGS. 2a, 2b, and 6b, and depicted in further detail by FIGS. 6a and 6c, causing acceleration in the deployment vehicle, not shown. The acceleration in the deployment vehicle is restrained by the coupling device, shown as 4 in FIGS. 1, 2a, 2b, and 6b, located between the tether mounting device and the ballast mass, shown as 3 in FIGS. 1, 2a, 2b, and 6b. This restraint transfers a force between the ballast mass and the tether mounting device. The net effect is the imbalance of the aforementioned tension must accelerate the ballast mass in addition to the tether material, together with the deployment vehicle, including spools and other attached equipment. Due to the inertia of the increase in mass, the acceleration is retarded substantially.

As the ballast mass is moved from its desired position relative to the beacon satellite, shown as 7 in FIGS. 1, 2a, 2b, and 6b, thrusters on the tug and/or deployment vehicle can be used to reposition the ballast mass relative to the beacon satellite. Thrusters may be pulsed on and off and may have some degree of variability but are not infinitely variable. The ballast mass will act as an inertial accumulator and will balance the disparity between force require to counter act the tension imbalance and the force available from the chosen thruster.

Figure 3A:
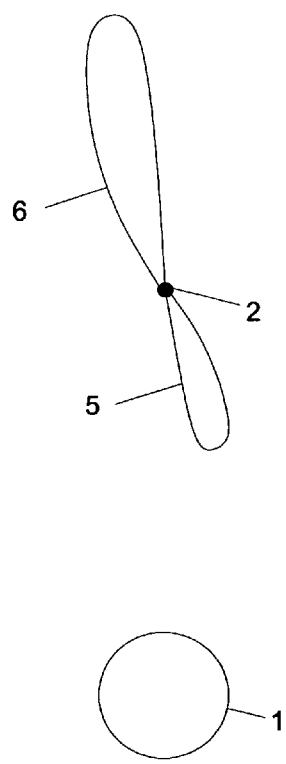
FIG. 3a Illustrates partial deployment

As tether is deployed, the tether attached to the spools will observe a radial velocity with the Earth-bound tether inwards and the out-bound tether outwards. Due to this velocity, and the rotation of the system of tethers, the Coriolis effect will be observed in the deploying tethers as depicted in FIG. 3a with the upper tether 6 experiencing a Westward drift, and the lower tether 5 experiencing an Eastward drift. The degree of drift is dependent on the deployment velocity. Faster deployment yields broader loops and a larger tilt from vertical. Additionally, the deploying tether will experience a torque induce by the gravity and centripetal gradients that will tend to counteract the Coriolis effect, and will react in a manner that tends to righten and elongate the loops.

The de-spooling of the tether ends are controlled such that the top tether, shown as 6 in FIG. 1, de-spools prior to the bottom tether, shown as 5 in FIG. 1. The time difference between the de-spooling will be related to the relative tether lengths. In an alternate configuration, the tether spools are released from the deployment vehicle prior to being fully de-spooled, with the timing of the release of the spools in a manner that is advantageous to the full deployment. It is envisioned that in this alternate configuration that the bottom tether portion, shown as 9 in FIG. 6b, will fully de-spool prior to Earth anchorage and be discarded, whereas the top tether portion, shown as 8 in FIG. 6b, will contain thrusting devices and will be partially de-spooled and stabilized in a manner that is favorable to the full deployment of the tether.

During the stabilization period the ballast mass connection device clamping device, shown as 62 and 63 in FIG. 6a, and shown as 2 in FIG. 6b, may aid in the stabilization by pulling tether material, shown as 61 in FIG. 6a, and shown as 5 and 6 in FIG. 6b, through the clamping device.

In the alternate configuration it may be desirable to incorporate a more complicated movable tether clamping device such as the dual traversing clamping device with serpentine tether path, shown in FIG. 6c, capable of not only movement along the tether but also of slack and tension maintenance.

In consulting FIG. 6c, the tether material, shown as 73, 74, 75, 76, and 77, is wound in a serpentine manner through two similar movable tether clamping devices, the lower device, shown as 62c, 62d, 63c and 63d in FIG. 6c, and the upper clamping device, shown as 62a, 62b, 63a, and 63b and in FIG. 6c. Either the lower, or upper, movable tether clamping device would be chosen to be attached to the tether deployment vehicle, and the other movable tether clamping device, would be capable of being driven either towards, or away from, the first clamping device. The desired effect of the independent movement is to lengthen or shorten the tether segments, 74, 75, 76, between the movable clamping devices, and thereby shorten, or lengthen, the portion of the tether, shown as 73 and 77, outside of the tether interval between the two movable clamping devices. By independent movement of the tether clamping devices, the effective tether length can be controlled, as well as the relative attachment point with respect to geosynchronous Earth orbit altitude.

The principal concept of this invention is to maintain as much of the tether mass as possible, as close to the ballast mass for the majority of the deployment duration, then after de-spooling or in an alternate configuration near de-spooling the tether ends, shown as 8 and 9 in FIGS. 1 and 6b, consume as short of time as possible until tether anchorage of Earth-end of tether at Earth anchor point, shown as 10 in FIG. 1, and positioning of outbound end of upper tether portion towards a near vertical position above the Earth anchor point.

The distinctive advantage of performing deployment in this manner is in fuel conservation and in lowering the thrust requirements during deployment. This advantage results in less mass lifted to geosynchronous Earth orbit altitude, and subsequently less cost for deployment.

The timing of the de-spooling of the upper tether portion, shown as 6 in FIGS. 1 and 6b, is timed such that the upper end of upper portion of the tether, or in the alternate configuration the upper portion of the tether together with the upper end tether spool, assumes a position reasonably close to vertical, shown as 8 in FIGS. 4b and 6b, at the approximate time as the bottom portion of the tether, shown as 5 in FIGS. 1 and 6b, and more specifically as the Earth-end of the bottom portion of the tether, shown as 9 in FIGS. 1 and 6b, reaches the Earth anchor point, shown as 10 in FIG. 1.

The ends of the tether, shown as 8 and 9 in FIGS. 1 and 6b, and shown elsewhere on other figures, may contain a radar reflective device to aid in monitoring the deployment progress. The bottom tether end, shown in detail as 55 in FIGS. 5a and 5b, may contain or be shaped to provide for a particular aero dynamic properties such as a drogue chute for controlled entry, shown as 53 in FIGS. 5a and 5b, and/or end clasp, knob, or small mass object, shown as 51 in FIGS. 5a and 5b, to facility anchorage at Earth.

Figures 5A, 5B:
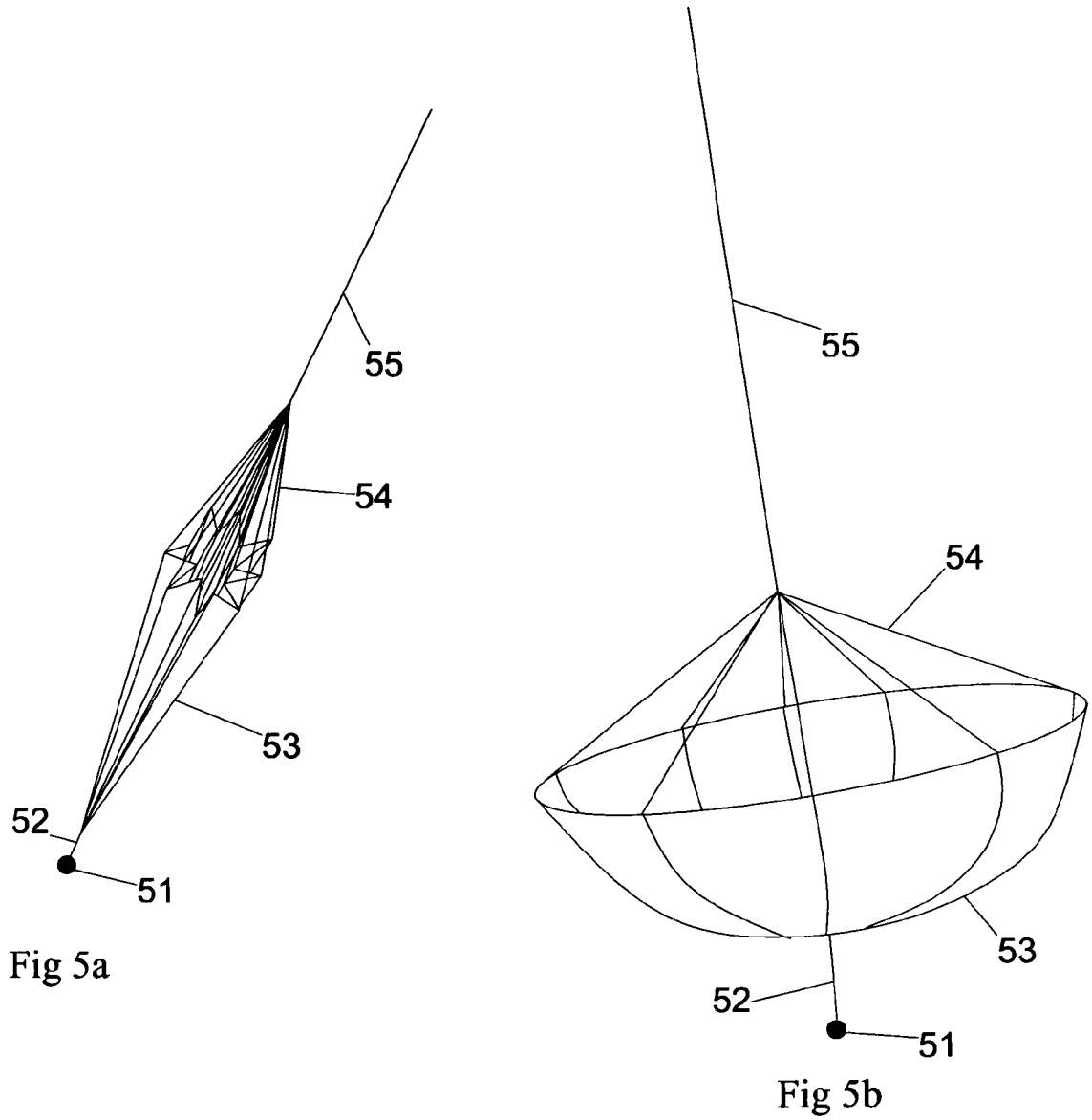
FIG. 5a Illustrates drogue chute on Earth-end of tether during insertion of tether into atmosphere FIG. 5b Illustrates drogue chute on Earth-end of tether during attempted extraction of tether from atmosphere FIG. 6a Illustrates a movable tether clamping device FIG. 6b Illustrates partially deployed anchored tether prior to stabilization during period of operation of movement of movable clamping device and prior to completion of deployment of upper portion of tether.

Consulting FIG. 5a and FIG. 5b, the Earth-end of the lower tether portion, shown as 55, will alternately experience an insertion mode, depicted by FIG. 5a, and it is anticipated to experience an attempted extraction mode, depicted by FIG. 5b. While it is desirable to have the Earth-end penetrate to sea level as quickly as possible, penetration mode, depicted by FIG. 5a, it is also desirable to inhibit extraction from the atmosphere, depicted by FIG. 5b, which will occur due to tension fluctuations in the lower tether portion prior to anchoring. During penetration mode, the tension on the tether end 55 is insufficient to support the weight of a small mass object 51 in, plus drogue chute 53, thus permitting the small mass object 51 to drag the tether Earth-end 55 down towards Earth by way of the connectivity of short tether 52, collapsed drogue chute 53, and shroud lines 54.

This connectivity, in penetration mode, and direction of fall, causes the collapse of the drogue chute, depicted in FIG. 5a, and thus presents a smaller aerodynamic area, and as a consequence, permits a relatively rapid descent rate. Whereas should the tension of the Earth-end of the tether, shown as 55 in FIG. 5b, exceed that of the weight of the small mass object, shown as 51 in FIG. 5b, and drogue chute, shown as 53 in FIG. 5b, together with shroud lines, shown as 54 in FIG. 5b, then the Earth-end of the tether, shown as 55 in FIG. 5b, will progress towards extraction from the atmosphere. This is called extraction mode. Extraction mode is resisted by the drogue chute, shown as 53 in FIG. 5b, to be pulled in a manner as to cause a filling up with air, which results in presenting a larger aerodynamic cross section, shown as 53 in FIG. 5b. The weight of the small mass, shown as 51 in FIG. 5b, is transferred through the short tether, shown as 52 in FIG. 5b, to the drogue chute, shown as 53 in FIG. 5b, and then shroud lines, shown as 54 in FIG. 5b, then eventually to the Earth-end of the lower tether, shown as 55 in FIG. 5b. This transferred weight, and the increased aerodynamic drag of the drogue chute, transfers a resistive force through the shroud lines, shown as 54 in FIG. 5b, to the Earth-end of the tether, shown as 55 in FIG. 5b, thus making tether extraction from the atmosphere more difficult.

The shroud material for the drogue chute, shown as 53 in FIGS. 5a and 5b, or material added to the drogue chute, not shown, will have the property such that upon entry into the ocean water, the shroud material is buoyant enough to support, that is float, the small mass object, shown as 51 in FIG. 5b, together with the connecting tether, shown as 52 in FIG. 5b, the drogue chute, shown as 53 in FIG. 5b, the shroud lines, shown as 54 in FIG. 5b, and any portion of the Earth-end of the tether, shown as 55 in FIG. 5b, that should happen to fall into the ocean. Further, the drogue chute, or material added to the drogue chute, will absorb, or otherwise capture, and hold, sufficient water mass to inhibit extraction from the ocean.

Once Earth-end of tether is anchored at anchorage position, shown as 10 FIG. 1, the tension differential, as measured at tether mounting device, shown as 2 in FIG. 4, between the lower and upper portions of the tether. When the tension for the upper portion of the tether exceeds the tension for the lower portion of the tether, as measured at the tether mounting device, then the tether mounting device, shown as 2 in FIG. 4b, is disconnected from the coupling device, not shown in FIG. 4b, but shown as 4 in FIGS. 1, 2a, and 2b, and disconnected from the deployment vehicle, not shown. This results in the deployed tether being freed from the deployment vehicle and ballast mass, but not freed from the tether mounting device, which may be used for additional tether deployment.

In the alternate configuration, the tether has a movable tether mounting device, shown as 62 and 63 in FIG. 6a, and to facilitate Earth capture, excess tether material will be deployed on the Earth-end of the tether, shown as 5 in FIG. 6b. Once anchorage is assured, which may be prior to anchorage, the movable tether clamping device may engage to pull tether material from the lower tether portion, either into the tether deployment vehicle, or pass the tether material through to the upper tether portion.

It is envisioned that the tether mounting device will remain on the tether, and the tether to ballast coupling device will reside with the deployment vehicle or ballast mass. However, it should be noted that the coupling device may consist of a short piece of tether materiel which is severed.

Figure 3B:
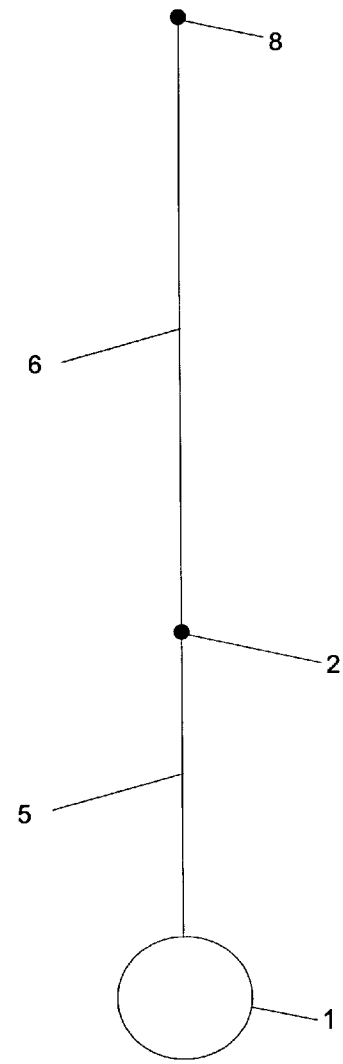
FIG. 3b Illustrates complete deployment

After decoupling the tether from the ballast mass and deployment vehicle, depicted by FIG. 4b, the full space elevator will take some period of time to stabilize into its desired configuration depicted by FIG. 3b.

After stabilization, a second deployment vehicle, ostensibly the same design as the initial deployment vehicle, with similarly wound tether, but potentially higher load carrying capacity tether, together with coupling device, shown as 11', 12', 5', 6', and 2' of FIG. 4a (not to scale), would be launched to couple with the now initially deployed tether, shown as Sand 6 in FIG. 4a, at the geosynchronous Earth orbit altitude tether mounting device, shown as 2' in FIG. 4a. The effective result being that the initially deployed tether substitutes for the ballast mass, shown as 3 in FIG. 2a, and tether to ballast coupling device, shown as 4 in FIG. 2a, of the initial deployment. It is envisioned that subsequent deployments will not incorporate the use of a beacon satellite for use in station keeping.

Additional tethers are added in this manner until the load carrying capacity of the sum of the tethers is sufficient enough to support the first climber.

This deployment method is suitable for use on other planetary bodies.

What I claim as my invention is:

1. A tether deployment system for a space elevator comprising:
    a deployment vehicle with a propulsion system,
    said deployment vehicle containing a dual-spooled tether, wherein the material of said tether is flexible,
    wherein a first spool of said dual-spooled tether contains a first portion of tether consisting of the approximate portion of said tether for extending in a loop above the geosynchronous orbit altitude of a planetary body about which said tether deployment system orbits, and
    wherein a second spool of said dual-spooled tether contains a second portion of tether consisting of approximately the remaining portion of said tether for extending in a loop below said geosynchronous orbit altitude.

2. The tether deployment system of claim 1, wherein the tether deployment system is placed near said geosynchronous orbit altitude of said planetary body, above a favorable anchorage position on said planetary body.

3. The tether deployment system of claim 1, further comprising:
    a tether clamping device affixed to the exposed portion of tether between said first and second spool,
    said tether clamping device consisting of: a simple clamp, a motorized movable clamp, or a series of motorized movable clamps.

4. The tether deployment system of claim 3, further comprising:
    a first ballast mass for stabilizing the tether deployment system during the deployment of said tether, said first ballast mast being connected to said tether clamping device,
    wherein said first ballast mass comprises at least one of: discarded geosynchronous orbiting satellites, operational satellites, additional spooled tether deployment systems, fuel, supplies, equipment, and dead-weight ballast.

5. The tether deployment system of claim 4, further comprising:
    a beacon satellite,
    wherein said beacon satellite functions as a reference point for orbital maintenance of said tether deployment system, and
    wherein said beacon satellite is delivered with and deployed from said tether deployment system into geosynchronous orbit at said geosynchronous orbit altitude.

6. The tether deployment system of claim 5, wherein said propulsion system maintains the position of said first ballast mass near said geosynchronous orbit altitude and proximal to said beacon satellite.

7. The tether deployment system of claim 4, further comprising:
    a drogue chute and a second ballast mass,
    wherein said second portion of tether is attached to said drogue chute and said second ballast mass,
    wherein said drogue chute is configured to react to aerodynamic forces, and
    wherein said second ballast mass increases the gravitational force between said second portion of tether and said planetary body.

8. The tether deployment system of claim 7, further comprising:
    an explosive or spring driven anchorage device attached to said second portion of tether for attaching said second portion of tether to a solid mass.

9. A method for deploying the tether deployment system of claim 4, comprising:
    extracting tether from said first and second spool using the gravitational and centripetal forces acting upon said tether,
    forming a first loop of tether between said first spool and said tether clamping device, wherein said first loop of tether extends towards said planetary body, and
    forming a second loop of tether between said second spool and said tether clamping device, wherein said second loop of tether extends away from said planetary body.

10. The method for deploying of claim 9, further comprising:
    controlling the deployment rates of said first and second loops of tether with a braking device.

11. The method for deploying of claim 10, further comprising:
    determining when the tether deployment system has achieved a self-standing configuration, and
    disconnecting the tether clamping device from the first ballast mass when said self-standing configuration has been achieved.

12. The method for deploying of claim 9, further comprising:
    sensing at the tether clamping device a tension differential between said first portion of tether and said second portion of tether, and
    moving said tension clamping device relative to said tether in response to said tension differential.

* * * * *